(12) United States Patent
Izhikevich et al.

(10) Patent No.: US 8,467,623 B2
(45) Date of Patent: Jun. 18, 2013

(54) INVARIANT PULSE LATENCY CODING SYSTEMS AND METHODS SYSTEMS AND METHODS

(75) Inventors: Eugene M. Izhikevich, San Diego, CA (US); Botond Szatmary, San Diego, CA (US); Csaba Petre, San Diego, CA (US)

(73) Assignee: Brain Corporation, San Diego, CA (US)

( * ) Notice: Subject to any disclaimer, the term of this patent is extended or adjusted under 35 U.S.C. 154(b) by 482 days.

(21) Appl. No.: 12/869,583

(22) Filed: Aug. 26, 2010

(65) Prior Publication Data

US 2011/0235914 A1    Sep. 29, 2011

Related U.S. Application Data

(60) Provisional application No. 61/318,191, filed on Mar. 26, 2010.

(51) Int. Cl.
| | |
|---|---|
| G06F 17/00 | (2006.01) |
| G06K 9/36 | (2006.01) |
| G06K 9/46 | (2006.01) |
| G06K 9/32 | (2006.01) |
| G06K 9/40 | (2006.01) |
| H03K 7/04 | (2006.01) |
| H03K 9/04 | (2006.01) |
| H03K 7/06 | (2006.01) |
| H03K 9/06 | (2006.01) |
| H04B 14/04 | (2006.01) |
| H04N 7/24 | (2011.01) |
| G06F 15/18 | (2006.01) |
| G06J 1/00 | (2006.01) |
| G06N 3/00 | (2006.01) |
| A61N 1/00 | (2006.01) |

(52) U.S. Cl.
USPC ........... 382/239; 382/254; 382/298; 375/239; 706/35; 708/101; 348/471; 607/141

(58) Field of Classification Search
USPC ................. 375/237–239, 241–242, 244, 247, 375/256, 259–260, 353, 377; 382/153, 155, 382/162, 165, 190, 232, 239–240, 254, 260, 382/293, 298–301; 706/15, 20, 22, 34–35; 708/101; 348/14.12–14.13, 469, 471–472
See application file for complete search history.

(56) References Cited

U.S. PATENT DOCUMENTS

| | | | | |
|---|---|---|---|---|
| 2004/0136439 | A1* | 7/2004 | Dewberry et al. | 375/130 |
| 2006/0094001 | A1* | 5/2006 | Torre et al. | 435/4 |

(Continued)

OTHER PUBLICATIONS

Paugam-Moisy, Hélene, and S. M. Bohte. "Computing with spiking neuron networks." Handbook of Natural Computing, 40p. Springer, Heidelberg (2009).*

(Continued)

*Primary Examiner* — Randolph I Chu
*Assistant Examiner* — Nathan Bloom
(74) *Attorney, Agent, or Firm* — Pillsbury Winthrop Shaw Pittman LLP

(57) ABSTRACT

Systems and methods for processing image signals are described. One method comprises obtaining a generator signal based on an image signal and determining relative latencies associated with two or more pulses in a pulsed signal using a function of the generator signal that can comprise a logarithmic function. The function of the generator signal can be the absolute value of its argument. Information can be encoded in the pattern of relative latencies. Latencies can be determined using a scaling parameter that is calculated from a history of the image signal. The pulsed signal is typically received from a plurality of channels and the scaling parameter corresponds to at least one of the channels. The scaling parameter may be adaptively calculated such that the latency of the next pulse falls within one or more of a desired interval and an optimal interval.

27 Claims, 1 Drawing Sheet

U.S. PATENT DOCUMENTS

| | | | | |
|---|---|---|---|---|
| 2008/0100482 | A1* | 5/2008 | Lazar | 341/110 |
| 2009/0287624 | A1* | 11/2009 | Rouat et al. | 706/20 |
| 2010/0036457 | A1* | 2/2010 | Sarpeshkar et al. | 607/53 |
| 2010/0081958 | A1* | 4/2010 | She | 600/544 |
| 2010/0225824 | A1* | 9/2010 | Lazar et al. | 348/723 |

OTHER PUBLICATIONS

Lazar, Aurel A., and Eftychios A. Pnevmatikakis. "Consistent recovery of sensory stimuli encoded with MIMO neural circuits." Computational intelligence and neuroscience 2010 (2010): 2.*

Lazar, Aurel A. "Multichannel time encoding with integrate-and-fire neurons." Neurocomputing 65 (2005): 401-407.*

Cessac, Bruno, Hélène Paugam-Moisy, and Thierry Viéville. "Overview of facts and issues about neural coding by spikes." Journal of physiology, Paris 104.1 (2010): 5.*

Wang, DeLiang. "The time dimension for scene analysis." Neural Networks, IEEE Transactions on 16.6 (2005): 1401-1426.*

Masquelier, Timothée. "Relative spike time coding and STDP-based orientation selectivity in the early visual system in natural continuous and saccadic vision: a computational model." Journal of computational neuroscience 32.3 (2012): 425-441.*

Gollisch, Tim, and Markus Meister. "Rapid neural coding in the retina with relative spike latencies." Science 319.5866 (2008): 1108-1111.*

Dorval, Alan D. "Probability distributions of the logarithm of interspike intervals yield accurate entropy estimates from small datasets." Journal of neuroscience methods 173.1 (2008): 129.*

Sato, Mitsutake, Masashi Murata, and Toshihiko Namekawa. "Pulse interval and width modulation for video transmission." Cable Television, IEEE Transactions on 4 (1978): 165-173.*

Aurel A. Lazar and Eftychios A. Pnevmatikakis, "A video time encoding machine", in Proceedings of the 15th IEEE International Conference on Image Processing (ICIP '08}, 2008, pp. 717-720.*

* cited by examiner

INVARIANT PULSE LATENCY CODING SYSTEMS AND METHODS SYSTEMS AND METHODS

CROSS-REFERENCE TO RELATED APPLICATIONS

The present Application claims priority from U.S. Provisional Patent Application No. 61/318,191 filed Mar. 26, 2010, entitled "Systems and Methods For Invariant Pulse Latency Coding," which is expressly incorporated by reference herein.

BACKGROUND OF THE INVENTION

1. Field of the Invention

The present invention relates generally to a computer vision processing systems and more particularly to systems that encode visual signals into pulse-code output having information encoded into pulse timing.

2. Description of Related Art

It is known in the field of neuroscience that neurons generate action potentials, often called "spikes", "impulses", or "pulses" and transmit them to other neurons. Such pulses are discrete temporal events, and there could be many pulses per unit of time. Conventionally, bursts of a few spikes are considered to be pulses. It is not known how the brain processes information based on the timing of pulses or how visual features may be encoded using pulse-timing.

BRIEF SUMMARY OF THE INVENTION

Certain embodiments of the present invention comprise systems and methods for encoding visual signals into pulse-code output, where the information is transmitted by the relative timings of pulses. The advantage of the invention is that the signal-to-pulse encoding is insensitive with respect to the luminance and the contrast of the input signals.

The present invention relates generally to a computer vision system that encodes visual signals into pulse-code output, where information is encoded into the timing of pulses. It is motivated by neuroscience findings that timing of pulses is important for information transmission and processing. This invention is useful for implementation of the function of an artificial retina in information processing, robotic, or prosthetic devices.

In certain embodiments systems and methods are provided that address issues associated with slow adaptation of pulse-time code to low or high levels of luminance and contrast. Certain embodiments provide systems and methods of decoding the pulse-time code to extract features of the visual signal independently from their luminance and contrast.

Certain embodiments of the invention provide systems and methods for processing image signals. In certain embodiments, an image processing method comprises obtaining a generator signal based on an image signal. Relative latencies associated with two or more pulses in a pulsed signal are determined using a function of the generator signal. The function of the generator signal can comprise a logarithmic function. The function of the generator signal can be the absolute value of its argument. Information can be encoded in the pattern of relative latencies. The step of determining the relative latencies can include determining the latency of a next pulse using a scaling parameter that is calculated from a history of the image signal. The pulsed signal is typically received from a plurality of channels and the scaling parameter corresponds to at least one of the channels. The scaling parameter may be adaptively calculated such that the latency of the next pulse falls within one or more of a desired interval and an optimal interval.

The method may additionally comprise scaling the generator signal using a parameter that is calculated by applying a low-pass filter to a function representative of prior generator signals. The generator signal may be scaled using a parameter that is calculated as the average of a function representing generator signals observed over a certain time period. The image signal may be scaled using a scaling parameter based on a history of the image signal. The step of determining the relative latencies typically includes determining the latency of a next pulse using a parameter that is calculated from a low-pass filter of a function of the latencies of a plurality of preceding pulses.

In certain embodiments, the method comprises scaling the generator signal using a parameter that is calculated from a history of the image signal and/or a history of the generator signal. The parameter can be adaptively calculated such that the latency of the next pulse falls within one or more of a desired interval and an optimal interval.

In certain embodiments, the image signal may be scaled using one or more parameters, each parameter calculated using a history of one or more of a plurality of signal channels. The image signal may be scaled to adaptively maintain the image signal within a desired range. Two or more of the plurality of signal channels can have a common channel parameter, and the common channel parameter may be calculated using a history of the image signal. The channel parameters may include a parameter obtained by low-pass filtering a function derived from the image signal. In some embodiments, the step of scaling the image signal includes scaling the signal multiplicatively. Channel parameters may represent an average of a function derived from the input signal over a time window.

In certain embodiments, the method comprises the step of determining latencies associated with the two or more pulses using one or more parameters calculated from a history of the image signal. Latencies associated with the two or more pulses may be determined by time-shifting the pulses by magnitudes determined by one or more channel parameters. The pulsed signal may be received from a plurality of channels. Information may be extracted from the pulsed signal by decoding the pattern of relative latencies.

Portions of the methods may be performed by one or more processors embodied in a prosthetic device, an autonomous robot and/or distributed computer systems.

Certain embodiments of the invention provide an image processing system. A filter may provide a generator signal that is based on an input signal representative of an element of an image. A processor may be configured to receive the input signal and to determine relative latencies associated with two or more pulses in a pulsed output signal using a function of the generator signal. Latencies of pulses in the pulsed output signal are calculated using a scaling parameter that is calculated from a history of the image signal. Information may be encoded in a pattern of relative pulse latencies between a plurality of channels be used to communicate the pulsed output signal. The pattern of relative pulse latencies is typically insensitive to changes in image luminance and/or image contrast. Scaling parameters correspond to at least one of the channels. In certain embodiments, the function of the generator signal comprises a logarithmic function which may be applied to a rectified version of the generator signal. The logarithmic function can have an offset and a base, which may be optimized to obtain a range of the generator signal that matches the dynamic range of the latency values and the dynamic range of the image signal. The filter is spatially and/or temporally balanced and characterized by a substantially zero integral along all dimensions of the filter.

DETAILED DESCRIPTION OF THE INVENTION

Figure 1:
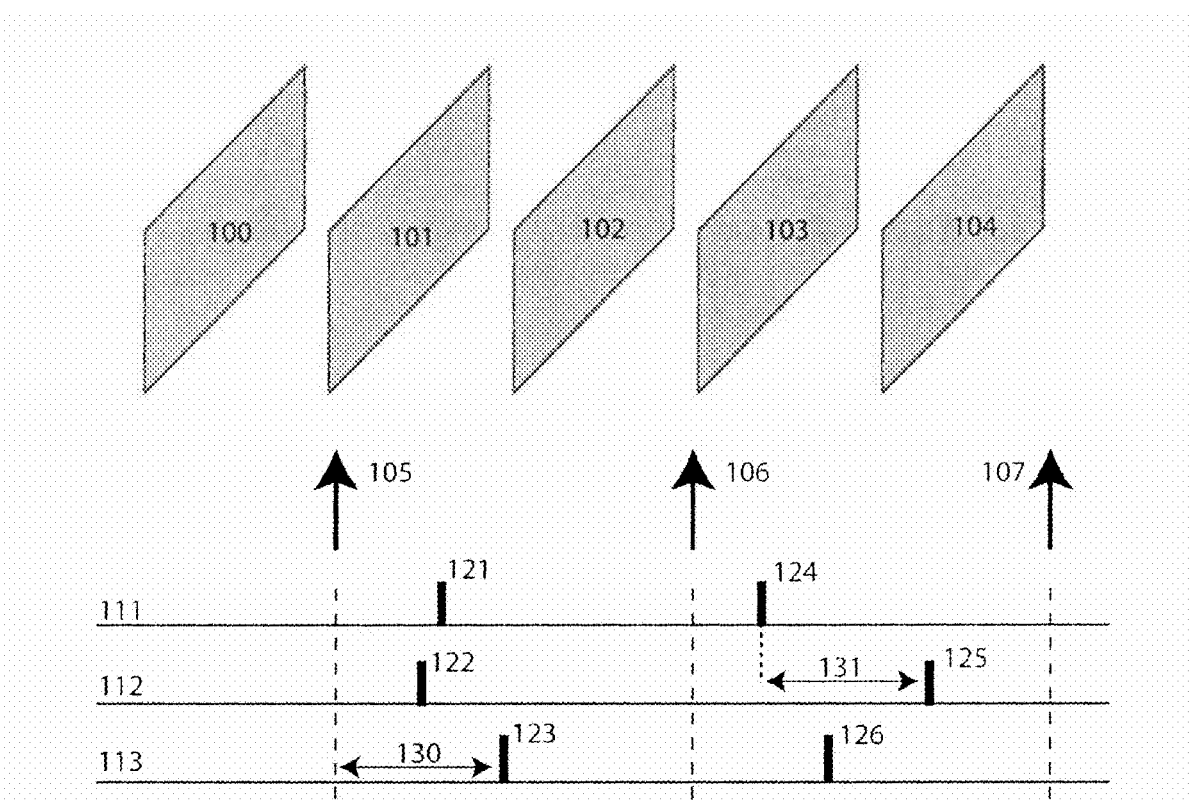
FIG. 1 illustrates the encoding of an input signal into latency of pulses along three communication channels.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Although certain aspects of the invention can best be understood in the context of conversion of visual input to pulse latency output in retina transmitted through multiple channels corresponding to retinal ganglion cells, disclosed systems and methods can be embodied in spatiotemporal filters implementing visual processing in general. For example, systems and methods according to certain aspects of the invention can be applied in a model of animal visual system as well as in the thalamus or cortex of an animal. Embodiments of the presently disclosed invention may be deployed in a hardware and/or software implementation of a computer-vision system, provided in one or more of a prosthetic device, robotic device and any other specialized visual system. For example, an image processing system according to certain aspects of the invention may comprise a processor embodied in an application specific integrated circuit ("ASIC") that can be adapted or configured for use in an embedded application such as a prosthetic device. Certain of the disclosed systems and methods may be used for processing of signals of other, often non-visual modalities. Certain of the disclosed systems and methods may be used for processing signals without spatial or temporal filtering.

For the purposes of this description, pulses are understood to refer to any of a single spike, a burst of spikes, an electronic pulse, a pulse in voltage, a pulse in electrical current, a software representation of a spike and/or burst of spikes and any other pulse in a pulsed transmission mechanism. For the purposes of this description, insensitivity of signal-to-pulse encoding with respect to luminance and/or contrast of an input signals may be understood as encoding that is invariant or substantially invariant to changes in luminance and/or contrast.

Certain embodiments of the invention can be used to encode visual features including features included in an observed scene, regardless of luminance and contrast. In some embodiments, information processing relies on different timing aspects of pulse timing in order to encode sensory input as a pulse-coded output, which can be used for further information transmission and processing.

For convenience and for the sake of illustration, we assume that the input signal is given as a function I(x,t) of space x and time t. For example, the function may describe a movie with frame number t and a two-dimensional image parameterized by the spatial two-dimensional vector-variable x, as illustrated in FIG. 1 (frames 100-104). One goal is to convert the input signal to a pulse code over many channels that is invariant to contrasts.

Contrast-Invariant Encoding

Without loss of generality, the signal may be represented in the equivalent form:

$$I/(x,t)=L(1-MS(x,t))$$

where the parameters L and M denote the luminance and the contrast, and the "feature" S(x,t) has zero mean calculated over space and/or time.

Such an image can be analyzed by a plurality of channels, each having a linear spatiotemporal filter with kernel F(x,s) satisfying the following "balance" condition:

$$\iint F(x,s)dxds=0 \qquad (1)$$

Each such filter can be applied to the input signal l(x,t) to obtain a "generator signal" of the corresponding channel $$g(t)=\iint I(x,t-s)F(x,s)dxds$$

The generator signal can be used to calculate the timing of pulsed response relative to the time t, i.e., the latency of response transmitted over each channel:

$$\text{Lat}=C-\log_B |g(t)|_+$$

where $|g(t)|_+$ is the rectified value of g(t), i.e., zero for negative g(t) and equal to g(t) when g(t)≧0. Other functions may be used in addition or in place of the piece-wise linear rectifier $||_+$. For the purposes of this description, "rectifier" can mean a piece-wise linear or other function that is positive such that the log function is well defined. Parameter C is the offset and parameter B is the base of the logarithm. These parameters are typically selected to optimize the efficiency of the logarithmic conversion, so that the relevant range of the generator signal g(t) is captured by the desired range of the latencies. For example, if the generator signal has a range of interest, $g_{min}$, $g_{max}$, and the desirable latency interval is $[l_{min}, l_{max}]$, then C and B can be found from the system of equations $l_{min}=C-\log_B g_{max}$, $l_{max}=C-\log_B g_{min}$. When g(t)=0 or g(t)<0, the latency of pulse may be assumed to be infinite. Such latency can be interpreted, e.g., as representative of non-generation of a pulse by a channel—corresponding to a pulse with infinite latency—or representative of a pulse generated with a relatively large latency. When $g(t)>g_{max}$, the channel may generate a pulse with very short latency. Negative latencies may be avoided by a cutoff at a value of $l_{min}$.

An example of signal to pulse latency encoding is illustrated in FIG. 1. In the example, the signal is depicted as a sequence of frames (frames 100-104). The conversion from signals to pulses occurs at time moments marked by arrows (105-107), which could occur every frame or at some frames, as shown in the drawing. Three output channels (111-113) generate pulses (121-126). Each such channel may have its own spatiotemporal filter, its own generator signal, and hence its own timing of pulses relative to the corresponding moment (vertical dashed lines next to arrows 105-107). For the purposes of this description, a latency of a pulse (e.g., 130 is the latency of the pulse 123) is distinguished from the difference between latencies (e.g., 131 is the difference between latencies of pulses 124 and 125), which is referred to herein as "relative latencies".

This approach offers the advantage that it results in contrast-invariant latency code; that is, individual latencies of pulses may depend on the contrast of the input signal, but relative latencies do not. Indeed, $$g(t) = \int\int I(x, t-s)F(x, s)dxds =$$
$$\int\int L(1+MS(x, t-s))F(x, s)dxds = LM\int\int S(x, t-s)F(x, s)dxds$$

because of (Eq. 1). For the sake of simplicity of notation, it can be assumed that the generator signal is positive, and $|\ |_+$ can be omitted from the equation. The latency of each channel is $$Lat = C - \log_B g(t) = C - \log_B LM \int\int S(x, t-s)F(x, s)dxds$$
$$= C - \log_B LM - \log_B \int\int S(x, t-s)F(x, s)dxds$$

Thus latency of pulsed response on each channel is shifted by the constant $\log_B LM$ that depends on the luminance and the contrast of the input signal. However, latencies of all channels are shifted by the same constant, so the differences between latencies (relative latencies) are independent of the values L and M; in particular, they are contrast-invariant.

The condition (Eq. 1) may be referred to as the "balance condition," which can be satisfied when $$\int f(x,s)dx = 0 \text{ (for all } s; \text{ "spatial balance")}$$

or $$\int f(x,s)ds = 0 \text{ (for all } x; \text{ "temporal balance")}$$

That is, the kernel, F, is zero along the spatial (dx) dimensions or temporal (ds) dimension, leading to "spatial" or "temporal" balance. It can also be zero even if neither of the two conditions above is satisfied, but the integral is evaluated along all dimensions. In practice, it is typically unnecessary to require that the integral be exactly zero and a small non-zero number may be permitted. In this case, the contrast-invariant pulse encoding will be approximate, i.e., it will contain a small error which is proportional to the absolute value of the integral in (Eq. 1). Since exact zeros may be difficult to achieve in practice, "approximate zero" condition may be considered to be a balance condition.

In certain embodiments, filters other than linear spatiotemporal filters may be used. The "balance condition" or "approximate zero" condition may be satisfied for motion sensitive filters, direction sensitive filters, certain nonlinear filters and other filters. A motion sensitive filter can comprise any suitable spatiotemporal filter that is responsive to the movement of a visual stimulus over the visual field in time. A direction sensitive filter can comprise a motion sensitive filter that is more responsive to motion of a stimulus over the visual field in some subset of all possible directions.

Latency Adaptation

It can be advantageous to adapt the sensitivity of the encoding mechanism such that latency within desired bounds adequately encodes inputs having luminance or contrasts that may vary over space and/or time by orders of magnitude. In certain embodiments, the generator signal may be mapped to latencies via the equation $$Lat = C - \log_B |g(t)/a(t)|_+$$

where the "adaptation" variable $a = a(t)$ evolves according to the differential equation $$da/dt = (|g(t)| - a)/\tau$$

(or its integral or discrete analogue) where $da/dt$ is the derivative with respect to time $t$, $|g(t)|$ is the absolute value of $g(t)$, and $\tau$ is the adaptation time constant. The adaptation variable $a(t)$ keeps track of the "average" value of $|g(t)|$, so that the latency indicates deviations from the average value. In another embodiment, the differential equation for the adaptation variable may be $$da/dt = (-1 + (e + |g(t)|)/a)/\tau$$

where $e > 0$ is some small number that is used to cap the unbounded growth of $a$ if $g(t) = 0$ for a long time. It will be appreciated that a difference between the two equations above is that the generator signal affects the time constant of adaptation in the latter case, but not in the former case.

In certain embodiments, the equation may also be $$da/dt = (f(g(t)) - a)\tau$$

with some function $f$. A nonlinear (in a) version $$da/dt = f(g(t), a)$$

(or its integral or discrete analogue) is also possible. In this case, the variable $a(t)$ may reflect the history of $g(t)$ over a certain time window (possibly infinite, as in low-pass filtering).

This mechanism achieves the following desirable functions:

If $g(t)$ varies between different output values due to contrast value changes in its input, $a(t)$ will approach the average of such values of $g(t)$.

If $g(t)$ becomes very small, $a(t)$ will decrease proportionally so that the ratio $g(t)/a(t)$ approaches 1.

Similarly, if $g(t)$ becomes very large, $a(t)$ will grow and the ratio $g(t)/a(t)$ will approach 1 too.

Thus, the adaptation variable shifts the latency of pulses so that they always vary around certain "optimal" values, resulting in temporal contrast adaptation. In the example above, the optimal latency value, L, is $C - \log_B 1 = C$.

The adaptation parameter can also be a vector. For example, the filter $F(x,t)$ may be decomposed into a number of separate filters that are used to compute separate generator signals, which are combined to determine the main generator signal. In the visual system, for example, the filter $F(x,t)$ may have separable center and surround regions, and hence the adaptation parameter could have 2 values, one for the center and one for the surround. Both, the center and the surround, can adapt independently, and the adaptation vector would scale each corresponding generator signal, thereby affecting the main generator signal.

An alternative adaptation mechanism may adjust each latency by a subtractive parameter, i.e., $$Latency = Lat - b(t)$$

where b(t) depends on the history of the latencies Lat, which are computed as above. For example, it can be a low-pass filter $$db/dt = (P(\text{Lat}) - b)/\tau_s$$

(or its integral or discrete analogue), where P(Lat) is a function that restricts the values of Lat to a certain interval, e.g., by ignoring the values where Lat is infinity (which would correspond to g(t) being negative or zero) and replacing them with a finite number. Parameter $\tau_s$ is the time constant of the low-pass filter. One implementation of the low-pass filter functionality is the running average of P(Lat) over a certain time window. A nonlinear (in b) version of the equation above $$db/dt = f(\text{Lat}, b)$$

is also possible.

The choice of the nonlinear function $f$ may be different for different variables (a or b) and for different applications. For example, the function may make the parameters adapt to the changing ranges of the magnitude of the input signal, its contrast, or its spatial and/or temporal statistics.

Input Signal Adaptation

In addition to the adaptation of the latencies conducted by the "adaptation variable" a(t) or b(t) and affecting directly the logarithmic conversion of the generator signal to latencies, it may be necessary and/or desirable to have an adaptation of the input signal itself. Such input signal adaptation may be referred to as "cone adaptation" as if the input signal were the signal coming from cone photoreceptors of retina, though the method would work for any other type of signal.

It is often desirable to take a raw signal I(x,t) and convert it to a rescaled signal J(x,t) where the values of J(x,t) at any spatial location, x, are deviations (positive or negative) from a certain "mid-point" value, which e.g. could be the mean of I(x,t) at the same location (and hence it would depend on x), or the mean over the entire signal, or the mean over a part of it. This way, the rescaled signal J(x,t) reports changes from the mean. However, if the mean of I(x,t) changes, e.g., due to changed luminance or contrast, it may be desirable that the rescaling and conversion to J(x,t) should also change adaptively, thereby modeling the cones of a retina.

In certain embodiments. It may be desired that the rescaled signal has approximately zero mean and deviations of the order of k from the mean for some constant k that might depend on the particular software and hardware restrictions. For example, in one example implementation, a value of k=127 is used when the pixel values are within the range [0, 255]. This can be achieved if $$J(x,t) = I(x,t)p - k$$

with an appropriate (possibly x-dependent) parameter p that adapts to the changing statistics of I(x,t) as to keep I·p∼k, which can be achieved through the following equation:

$$dp/dt = (1 - p\, I(x,t)/k)/\tau_p$$

Here, $\tau_p$ is the input signal adaptation time constant. However, the input signal may be absent (i.e., I(x,t)=0) for a long period of time and, in this case, p will be growing unboundedly with the grown rate $1/\tau_p$. To cope with such condition, an upper bound may be set for the value of p. A slightly modified equation may be used:

$$dp/dt = (1 - p[e + I(x,t)]/k)/\tau_p$$

where e>0 is a small parameter that would play the bounding role when I(x,t)=0 because p will asymptote at k/e in this case. In one example, for an input signal encoded as an RGB image with discrete values between 0 and 255, values of k=127 and e=1 may be used. In one embodiment, a 1 can be added to all pixels of the input signal and used the equation with no e.

In certain embodiments, the equation for signal adaptation may be $$dp/dt = (k/[e + I(x,t)] - p)/\tau$$

Notice that the difference between the two equations above is that the input signal affects the time constant of adaptation in the former case, but does not in the latter case. A nonlinear version of the input signal adaptation is also feasible $$dp/dt = f(I(x,t), p) \qquad (2)$$

with some function $f$ such that it promotes I·p∼k.

In another embodiment, the rescaled (adjusted) image may be given by $$J(x,t) = I(x,t) - p$$

where the offset p adapts to the input signal, e.g., via the low-pass filter differential equation $$dp/dt = (I(x,t) - p)/\tau$$

or via a nonlinear function (Eq. 2).

Decoding

Figure 2:
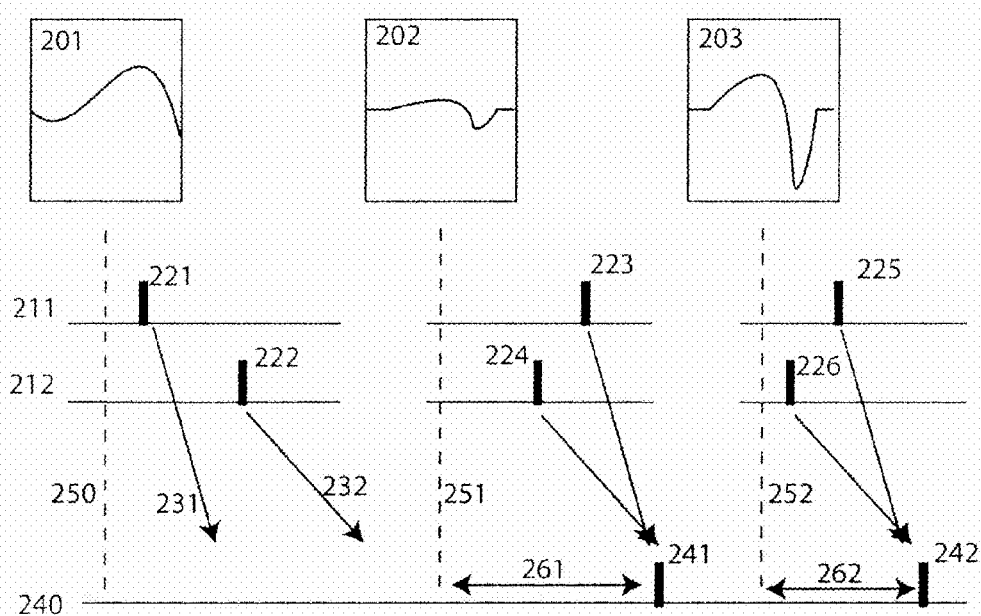
FIG. 2 illustrates the decoding mechanism of latency code employed in certain embodiments of the invention.

Certain embodiments have pulsed outputs whose relative latencies are invariant with respect to signal contrast is desirable for a decoder, whose job, e.g., may be to perform pattern recognition of the signal that is independent of attributes such as contrast. In one example, the decoder comprises a coincidence detector that signals coincident arrival of pulses. In another example, the decoder may receive input from the encoder with different transmission delays, as illustrated in FIG. 2. Such a decoder may generate a pulsed output when the relative latencies of pulses match the difference of transmission delays, and ignore other inputs. The response of such a decoder will typically be invariant to the contrast of the input signal. In another example, the decoder may be part of an organic nervous system, such as the nervous system of an animal which can receive input from a prosthetic device.

For example, suppose a signal (201) provided in one image frame results in two output pulses (221 and 222) generated by two channels (211 and 212) with certain latency from the time marked by the dashed line (250). The pulses arrive to the decoder (240) with certain transmission delays indicated by the arrows (231 and 232). Because the pulses arrive at different time, the decoder, being a coincident detector, will not register a coincidence. Now, another input signal (202) results in pulsed output with latencies (223 and 224) that have relative latencies (i.e., the difference of latencies) matching the difference of transmission delays. Such pulses arrive to the decoder at the same time (241) resulting in an output pulse. Increasing the contrast of the input signal (203) results in pulsed output (225 and 226) with shorter latencies, yet the same relative latencies (latency differences), which again matches the difference between transmission delays.

Thus, signals with different levels of contrast result in pulsed outputs with different latencies but with the same relative latencies and they can be readout by a decoder that receives these pulses along channels with different transmission delays that match the latency differences. Notice also that the decoder generates a pulsed output whose latency depends on the latency of the incoming pulses. Indeed, the latency 261 of the output pulse 241 is longer than the latency 262 of the output pulse 242.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for processing image signals. In certain embodiments, an image processing method comprises obtaining a generator signal based on the image signal. In certain embodiments, the method comprises determining relative latencies associated with two or more pulses in a pulsed signal using a function of the generator signal. In some of these embodiments, information is encoded in the pattern of relative latencies. In some of these embodiments, the step of determining the relative latencies includes determining the latency of a next pulse using a scaling parameter that is calculated from a history of the image signal. In some of these embodiments, the pulsed signal is received from a plurality of channels. In some of these embodiments, the scaling parameter corresponds to at least one of the channels. In some of these embodiments, the scaling parameter corresponds to at least two of the channels. In some of these embodiments, the scaling parameter is adaptively calculated such that the latency of the next pulse falls within one or more of a desired interval and an optimal interval. In some of these embodiments, the function of the generator signal is the absolute value of its argument.

In certain embodiments, the method comprises scaling the generator signal using a parameter that is calculated by applying a low-pass filter to a function representative of prior generator signals. In certain embodiments, the method comprises scaling the image signal using a scaling parameter based on a history of the image signal. In some of these embodiments, the step of determining the relative latencies includes determining the latency of a next pulse using a parameter that is calculated from a low-pass filter of a function of the latencies of a plurality of preceding pulses. In some of these embodiments, the function of the generator signal comprises a logarithmic function.

In certain embodiments, the method comprises scaling the generator signal using a parameter that is calculated from a history of the image signal. In certain embodiments, the method comprises scaling the generator signal using a parameter that is calculated from a history of the generator signal. In some of these embodiments, the parameter is adaptively calculated such that the latency of the next pulse falls within one or more of a desired interval and an optimal interval.

In some of these embodiments, the image signal comprises a plurality of signal channels, and further comprising scaling the image signal using one or more parameters, each parameter calculated using a history of one of the signal channels. In some of these embodiments, at least two of the plurality of signal channels have a common channel parameter, the common channel parameter being calculated using a history of the image signal. In some of these embodiments, the step of scaling the image signal includes adaptively maintaining the image signal within a desired range. In some of these embodiments, the one or more parameters includes a parameter obtained by low-pass filtering a function derived from the image signal. In some of these embodiments, the step of scaling the image signal includes scaling the signal multiplicatively. In some of these embodiments, one of the one or more parameters represents an average of a function derived from the input signal over a time window.

In some of these embodiments, the pattern of relative latencies is insensitive to image luminance. In certain embodiments, the method comprises the step of determining latencies associated with the two or more pulses using one or more parameters calculated from a history of the image signal. In certain embodiments, the method comprises the step of determining latencies associated with the two or more pulses by time-shifting the pulses by magnitudes determined by one or more channel parameters. In certain embodiments, the method comprises the step receiving the pulsed signal from a plurality of channels. In certain embodiments, the method comprises the step of extracting the information from the pulsed signal by decoding the pattern of relative latencies. In some of these embodiments, the one or more processors include a processor embodied in one or more of a prosthetic device and an autonomous robot. In certain embodiments, the method comprises the step of scaling the generator signal using a parameter that is calculated as the average of a function representing generator signals observed over a certain time period.

Certain embodiments of the invention provide an image processing system. Some of these embodiments comprise an input signal representative of an element of an image. Some of these embodiments comprise a filter that provides a generator signal based on the input signal. Some of these embodiments comprise a processor configured to receive the input signal and to determine relative latencies associated with two or more pulses in a pulsed output signal using a function of the generator signal. In some of these embodiments, latencies of pulses in the pulsed output signal are calculated using a scaling parameter that is calculated from a history of the image signal. Some of these embodiments comprise a plurality of channels that communicate the pulsed output signal. In some of these embodiments, the information is encoded in a pattern of relative pulse latencies between the channels. In some of these embodiments, the pattern of relative pulse latencies is insensitive to changes in at least one of image luminance and image contrast.

In some of these embodiments, the scaling parameter corresponds to at least one of the channels. In some of these embodiments, the function of the generator signal comprises a logarithmic function. In some of these embodiments, the logarithmic function is applied to a rectified version of the generator signal. In some of these embodiments, the logarithmic function has an offset and a base that are optimized to obtain a range of the generator signal that matches the dynamic range of the latency values and the dynamic range of the image signal. In some of these embodiments, the filter is spatially and temporally balanced and characterized by an integral along all dimensions of the filter that is substantially zero.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of encoding a given image in a series of images, the method being performed by one or more processors configured to execute computer program modules, the method comprising:

obtaining a scaled image by scaling the given image using a statistical parameter that is based on one or more images preceding the given image in the series of images;

obtaining a generator signal by applying a spatiotemporal filter to the scaled image, the generator signal conveying information associated with one or both of a spatial change or a temporal change between the given image and one or more images preceding the given image in the series of images; and providing a pulse signal comprising one or more digital pulses based on the generator signal such that a temporal latency associated with individual pulses encodes one or both of the spatial change or the temporal change conveyed by the generator signal, the temporal latency being based on the scaled image associated with the one or more images preceding the given image in the series of images.

2. A computer-implemented method of processing a series of images, the method being performed by one or more processors configured to execute computer program modules, the method comprising:

obtaining a plurality of generator signals by applying a spatiotemporal filter to the series of images, a given generator signal conveying information associated with one or both of a spatial change or a temporal change between a given image and one or more images preceding the given image in the series of images; and for the given image, determining a temporal latency associated with one or more digital pulses based on a function of the plurality of generator signals, the temporal latency encoding one or both of the spatial change or the temporal change conveyed by a corresponding generator signal, the temporal latency being scaled based on one or more previous images in the series of images.

3. The method of claim 2, further comprising: determining a parameter based on the one or more images;
wherein:
the given image comprises a plurality of pixels having a characteristic associated therewith; and
the obtaining the plurality of generator signals comprises scaling the characteristic using the parameter.

4. The method of claim 3, wherein the parameter comprises at least one of a multiplicative parameter and a divisional parameter.

5. The method of claim 3, wherein individual ones of the one or more pulses are configured to be communicated via a channel having the parameter and the spatiotemporal filter associated therewith.

6. The method of claim 5, wherein the encoding comprises determining an absolute value the generator signal.

7. The method of claim 2, wherein:
the function is characterized by two or more parameters;
individual ones of the one or more pulses are configured to be communicated via at least two channels, individual ones of the at least two channels having a parameter of the two or more parameters associated therewith; and
the spatiotemporal filter comprises at least two spatiotemporal functions associated with the respective channel of the at least two channels.

8. The method of claim 7, wherein the determining the latency is based on a time-shift of individual ones of the one or more pulses, magnitude of the time-shift being determined based the parameter associated with individual ones of the at least two channels.

9. The method of claim 2, wherein the series of images comprises a plurality of signal channels, and further comprising scaling individual ones of the series of images using one or more parameters, individual ones of the one or more parameters being determined based on a history of one of the signal channels.

10. The method of claim 9, wherein at least two of the plurality of signal channels have a common channel parameter, the common channel parameter being determined based on the history of the series of images.

11. The method of claim 9, wherein the one or more parameters are determined based on a low-pass filtering a function derived from the series of images.

12. The method of claim 9, wherein scaling the series of images comprises multiplicative scaling.

13. The method of claim 9, wherein an individual one of the one or more parameters are configured based on an average metric of at least a portion of the series of images corresponding to a time window preceding the given image.

14. The method of claim 2, further comprising:
encoding information related to a feature within the given image into a pattern of relative latencies, the relative latencies being based on latencies of individual of the one or more pulses, and a common reference; and
extracting the information from the one or more pulses by decoding the pattern of relative latencies.

15. The method of claim 14, wherein the common reference comprises a temporal latency of one pulse of the one or more pulses.

16. The method of claim 14, wherein at least one of the one or more processors is disposed in or proximate to a prosthetic device or an autonomous robot.

17. The method of claim 14, wherein the pattern of relative latencies is insensitive to image luminance.

18. The method of claim 2, further comprising scaling generator signal of the plurality of the generator signals associated with the given image based on a low-pass filter of at least a portion of the plurality of generator signals corresponding to respective portion of the series of images occurring prior to the given image.

19. The method of claim 2 wherein the determining the latencies of the one or more pulses comprises determining latency a given pulse of the one or more pulses based on a low-pass filter of a function of latencies of at least a portion of the one or more pulses preceding the given pulse.

20. The method of claim 2, wherein the function comprises a logarithmic function.

21. An adaptive processing system configured to process images, the system comprising:
one or more processors configured to execute computer program modules stored by one or more non-transitory computer-readable storage media, the computer program modules being executable to cause one or more processors to:
determine a filtered signal based on a spatio-temporal filter of one or more images in a series of images;
provide a scaled signal by scaling a portion of the filtered signal associated with a subsequent image using a parameter determined based on the one or more images occurring prior to the subsequent image; and
encode the filtered signal into a temporal latency of one or more digital pulses based on a logarithmic function of the scaled signal, the temporal latency being based on the scaled signal associated with the one or more images occurring prior to the subsequent image.

22. The system of claim 21,
wherein encoding further comprises determining the temporal latency of the one or more pulses based on the logarithmic function of the scaled signal.

23. The system of claim 22, the computer program modules are further executable to cause one or more processors to:
scale a portion of the filtered signal associated with a given image, based on one or more filtered signals associated with one or more images occurring prior to the given image;

wherein the temporal latency is configured based on the logarithmic function of the scaled signal.

24. The system of claim 21 wherein
the spatio-temporal filter is characterized by two or more parameters;
individual ones of the one or more pulses are configured to be communicated via at least two channels, individual ones of the at least two channels having a parameter of the two or more parameters associated therewith; and
the spatiotemporal filter comprises at least two spatio-temporal functions associated with the respective channel of the at least two channels.

25. The system of claim 21, wherein:
the one or more images are characterized by a luminance characteristic;
the logarithmic function is applied to a rectified version of the filtered signal; and
the logarithmic function is characterized by an offset and a base that are configured based on a range of values of the temporal latency and a range of values of the luminance characteristic.

26. The system of claim 21, wherein the spatio-temporal filter comprises a linear motion sensitive filter.

27. The system of claim 21, wherein the spatio-temporal filter comprises a linear direction sensitive filter.

* * * * *

UNITED STATES PATENT AND TRADEMARK OFFICE
CERTIFICATE OF CORRECTION

PATENT NO. : 8,467,623 B2  
APPLICATION NO. : 12/869583  
DATED : June 18, 2013  
INVENTOR(S) : Eugene M. Izhikevich et al.

Page 1 of 1

It is certified that error appears in the above-identified patent and that said Letters Patent is hereby corrected as shown below:

On the title page, item (54) and in the specification, column 1, lines 1-2, the title currently reads:

"INVARIANT PULSE LATENCY CODING SYSTEMS AND METHODS SYSTEMS AND METHODS"

Should read:

--INVARIANT PULSE LATENCY CODING SYSTEMS AND METHODS--

Signed and Sealed this  
Fifth Day of April, 2016

Michelle K. Lee  
*Director of the United States Patent and Trademark Office*